April 12, 1955 J. J. CALHOUN ET AL Re. 23,977

SELF-TRAVERSING DRIVE ROLL

Original Filed May 9, 1949

INVENTORS
JAMES JOSEPH CALHOUN &
HARRY MARSHALL COOK
BY
C. H. Montenson
ATTORNEY United States Patent Office Re. 23,977

Reissued Apr. 12, 1955

23,977

SELF-TRAVERSING DRIVE ROLL

James Joseph Calhoun, Waynesboro, and Harry Marshall Cook, Staunton, Va., assignors to E. I. du Pont de Nemours & Company, Wilmington, Del., a corporation of Delaware Original No. 2,646,227, dated July 21, 1953, Serial No. 92,176, May 9, 1949. Application for reissue July 20, 1954, Serial No. 444,678

12 Claims. (Cl. 242—43)

Matter enclosed in heavy brackets [ ] appears in the original patent but forms no part of this reissue specification; matter printed in italics indicates the additions made by reissue.

This invention relates to means for winding yarn, thread, wire or similar strand materials into a package on a tube, spool, or similar core and particularly to an improved means for rotating the package and at the same time traversing the thread longitudinally along the package.

It is common practice in the textile industry to wind a thread onto a rotating core and, by means of a reciprocating guide, to traverse the thread along the rotating core to form a cylindrical package. Well-known modifications of this principle produce other shaped packages such as cones, tapered packages, etc. In this type of machine, the reciprocating traverse has appreciable mass and since its direction of motion must be reversed at the end of each stroke, high stresses in the traversing mechanism occur if the reversal takes place at high speeds. This results in vibration and jarring of the mechanism, rapid wear of the moving parts and rough treatment of the material being wound. If the reversal is made slower, the thread piles up on the package at the reversal points and expensive expedients such as "secondary motions" are required to redistribute the piled-up thread. Consequently, the speed at which such a reciprocating traverse can be operated practically is limited to perhaps 400 cycles per minute or less. Furthermore, when the thread is wound at high speeds with this type of mechanism, it is wrapped onto the core in closely spaced helical coils, forming a so-called "parallel wind." It is desirable to space the coils farther apart, giving a so-called "cross-wound" package since this type of package is more stable in handling and the yarn will unwind from it more easily.

A method of avoiding the disadvantages of the conventional reciprocating guides comprises the use of a grooved traversing roll. In general, such a roll consists of a rotating drum having helical grooves cut in its surface and designed to rotate the core or yarn package by surface contact therewith. The thread runs in the groove and is traversed back and forth along the package as the drum rotates. Thus there are no heavy reciprocating masses and the device can operate at high speed with reduced vibration and wear. However, the known devices of this sort have serious drawbacks. Relatively high tension on the thread is required to keep it in the groove and this high tension results in yarn damage. Still more seriously, the reversal of the yarn at the ends of the traverse stroke does not occur instantly and consequently the yarn tends to pile up in dense layers at the ends of the traverse.

The object of this invention is to provide a winding device capable of winding thread, yarn, etc., at high speed without damaging the product to give improved packages relatively free from dense layers of yarn and easy to unwind in subsequent operations. Another objective is to make a winding device which is simple and inexpensive to build and easy to clean and maintain in operation. A still further object is the provision of a rapid reversal of the strand at the end of the stroke. Other objects will appear hereinafter.

The objects of this invention are well accomplished by the use of a rotatable member which has an endless groove cut in its outer surface. The groove contains no crossings and is cut helically in its major portion at an angle of from 5° to 25° with angles varying from 9° to 20° being preferred. This angle in the major portion is designated for convenience as the normal helix angle. Contained in the groove are at least two rapid reversal sections. Each comprises a helical cut in a minor portion of a groove at an angle which is greater than that of the major portion of the groove. The angle in the rapid reversal section varies from 15° to 90° with angles approximating 90° being preferred. In the preferred form the rapid reversal section is rounded and as such, it follows or is tangent to a helix angle greater than the normal helix angle. Usually the helical angle of the major portion is about 10° and the helical angle in the minor portion involved in the rapid reversal is about 90°. The groove depth is preferably about ½ to 1½ inches; the width of the groove varies from ⅛ to 1 inch, with widths of about ½ inch being preferred. The width and the depth of the *substantially vertical-walled* groove are uniform over the length of the groove and all edges are rounded and the surfaces of the groove are treated to prevent abrasion to the strand. The rotatable member surface drives the package onto which the yarn is to be wound, and in its rotation it carries the strand in the groove to the yarn package traversing the strand thereon simultaneously. At the rapid reversal points, the yarn is given an accelerated movement in the direction opposite to which it was being traversed in its approach to the rapid reversal point and this rapid reversal enables the production of properly wound packages. While the depth and the normal helix angle may be varied as indicated above, the particular value of these factors is chosen so that the quotient of the angle in degrees divided by the depth in inches is between 5 *and* [to] 40, with quotients of from 10 to 20 being preferred. Rolls designed with this relationship lead to improved packages because the strand stays in the groove better; less tension is needed; and there is less wear on the strand.

In the drawings, which are given for illustrative purposes only,

Figure 1:
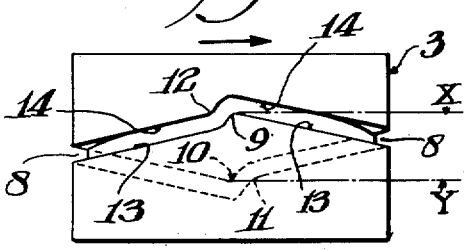
Figure 1 is a side view of one form of the traversing device of this invention.
Figure 3:
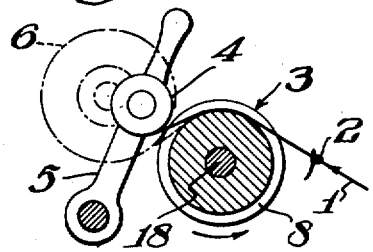
Figure 3 is a diagrammatic view of the yarn wind-up.
Figure 4:
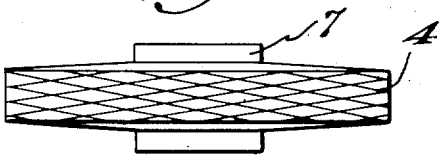
Figure 4 is a sketch of the package formed by the roll of Figure 1.

Referring to Figure 3, the yarn 1 is led from a supply source through a stationary guide 2 which is located in a plane approximately midway between the two reversal points of the groove, or midway of the distance X—Y, shown in Figure 1. For short strokes this centering is not critical but for long strokes best results are obtained with proper centering although dead centering is not absolutely essential. The guide is also located so that a yarn wrap from 45° to 135° around the roll is formed with wraps of 60° to 90° being preferred. From the guide, the thread passes on to the winding drum or drive roll 3 of this invention. This roll runs in contact with the package 4 of yarn being wound. The package 4 is supported by a pivoted arm 5 designed to hold it in surface contact with the rotating drive roll 3. The rotation of the drive roll 3 therefore rotates the package 4 and causes the yarn to wind onto the package. As the package increases in size, shown by dotted lines 6, the arm 5 pivots about its support, still maintaining surface contact with the drive roll. When the package reaches its full size, it is removed; a new core is installed; and the operation is repeated. A core 7 is shown in Figure 4 bearing yarn 4.

As shown in Figure 1, the drive roll 3 has an endless groove 8 cut into its surface. Starting at the "reversal point" 9, and proceeding around the roll of Figure 1 in the direction of the arrow, the groove is cut in the form of a helix with a small helix angle for most of its path to the opposite reversal point 10. The normal helix angle continues from reversal point 9 to point 11 where the helix angle becomes greater in the approach to reversal point 10. Thereafter, the groove continues in the normal helix angle to approach point 12 where the helix angle again becomes greater to reversal point 9.

Thus, the last portions of the groove prior to the reversal points are cut with a helix of greater angle than the first portion of the groove.

Figure 5:
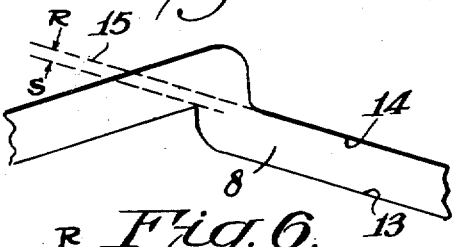
Figures 5, 6, 7 and 8 are partial developments of the surface of the roll showing variations in curvature of the groove at the point of yarn reversal.
Figure 6:
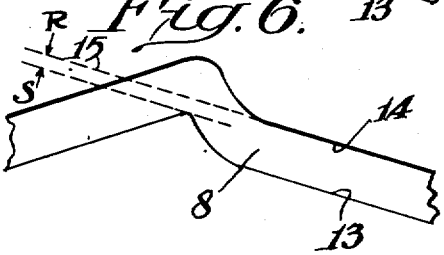
Figure 7:
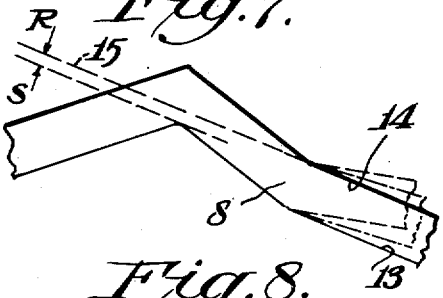

A rapid reversal section then commprises a bend in the groove, such as those shown in Figure 1 between the points 9 and 12 and between 10 and 11. This bend may involve an angle of from about 15° to 90°. Various rapid reversals are shown in Figures 5 to 7. That shown in Figure 5 is designated as a sharp reversal as compared to the rounded reversal of Figure 6. The two-lead reversal of Figure 7 is also operable in this invention and differs only slightly from those previously shown.

In operation, the yarn drops into the groove 8 and as the roll 3 rotates *in the direction of the arrow shown in Figure 1 with the yarn running downwardly at the right* it is traversed *toward X* along the surface of the package 4 by the edge 13 of the groove until it comes to the reversal point 9. As it passes this point, the thread is momentarily released from the wall 13. The tension, which may be very low, depending on the wind-up speed, on the thread starts pulling it toward the center of the traverse stroke, which covers approximately the distance from X to Y. This accelerates the return of thread from the edge of the cake. This accelerated reversal reduces the tendency of the yarn to lag or dwell at the ends of the stroke and to pile up in dense layers. Cooperating with the acceleration, the edge 14 of the groove picks up the thread [3] *1* and carries it to the next reversal, where the same action is repeated. Thus, the thread is traversed across the surface of the package by the main helical portion of the groove at a uniform speed until it reaches the end of the stroke, when it is momentarily released by the active edge, briefly accelerated by its own tension toward the center of the stroke and shortly thereafter again picked up by the opposite, successive active edge and traversed at uniform speed to the next reversal.

For effective sharp reversal, it is preferred that the distance R—S from the reversal point, say 9, to the extension of active edge 14 shown by dotted line 15 in Figures 5 and 6 be at least ⅛ of an inch. If the distance is less, the thread string up and spinning continuity are poor. If greater, there occurs a lag which results in built up shoulders on the package. However, this distance is not limitative, for in other embodiments, such as two lead grooves shown in Figure 7, the extended line may intersect or be on either side of the reversal point. *The dotted lines in Figure 7 represent two other possible positions of the main lead groove; in general, the approach of the main lead grooves to the reversal lead portions will involve substantially the same angles.*

Figure 8:
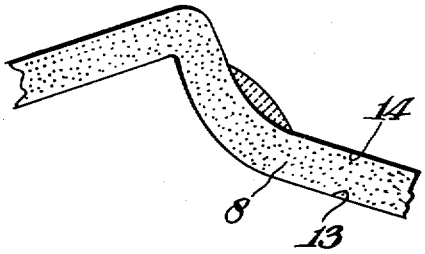

In Figure 8 is shown a reversal which is inoperable unless the shaded area is removed. Such removal in effect, of course, brings the active edge into proper position and the reversal becomes very much like the rounded reversal of Figure 6. Since grooves of uniform width and depth are preferred such modifications as shown in Figure 8 are not normally used. The rounded reversal of Figure 6 is preferred.

Figure 2:
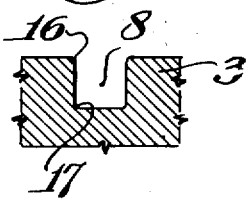
Figure 2 is a cross section through the groove.

As shown in Figure 2, the upper and lower corners, 16 and 17, respectively, of the *substantially flat bottomed* grooves, *having the substantially vertical strand contacting members or walls,* are preferably rounded to facilitate applying a desirable surface to the roll and to prevent damage or abrasion of the yarn due to sharp edges. A radius of about 1/32 inch is customarily employed, but considerable variation in radius is permissible. Further, it has been found desirable to produce a "pebbly" surface, such as is shown in Figure 8, consisting of minute rounded hills and valleys on all portions of the roll coming in contact with the yarn, and this effect can be obtained by sand blasting, liquid honing which is a wet blasting operation, or etching. It is also desirable that the surface be resistant to wear and corrosion and one way to accomplish this end is to chrome plate it. To illustrate, with a plated roll having a specially prepared pebbly surface only one-third as many yarn defects are obtained as when using, under similar circumstances, a plated smooth surfaced roll.

The grooves, which are, of course, wider than the strand diameters, are preferred to be relatively wide. Widths of ⅛ to 1 inch are preferred to make it easier to string up and to give the contacting edge of the groove a surface treatment to prevent damage to the yarn. The wide groove not only facilitates the cutting, surfacing, and plating of the grooves, but also makes it easier to clean the grooves. Infrequently, a thread breaks and wraps around the roll, instead of on the package. The wide groove permits the removal of the wrap easily by hand or with a tool. If the roll is fixedly attached to its drive shaft, the winding apparatus generally must be stopped to permit cleaning of the grooves or removal of a wrap. This is undesirable when more than one roll is driven by a common shaft. It has been found that if the bore of the roll 3 is a few thousandths of an inch greater than the diameter of the drive shaft 8, friction between the roll and its shaft will rotate the roll at substantially the same speed as the shaft, but the roll may be stopped by hand or with a brake to permit cleaning while the shaft is still running.

Another advantage of wide grooves lies in the fact that they form a gap in the periphery of the roll which permits the thread to drop into them easily. In practice, the thread need only be started on the core and it drops into the groove automatically and starts to traverse of its own accord. With narrow grooves, it is sometimes necessary to cut a gap in the periphery of the roll to lead the thread into the groove. Generally, a width of about ½ inch is preferred for ease of stringing up, cutting, surfacing, plating and cleaning.

The helix angle of the major portion of the groove, called the normal angle, may vary from 5° to 25°, as usually measured with reference to the circumference of the rotatable member. An angle of 9° to 20° is preferred. The angle of the rapid reversal is greater than the normal angle and may vary from 15° to 90°. Usually, the main groove or normal angle is 10° and the rapid reversal angle is close to 90°. The normal helix angle, the roll diameter, the stroke and the groove depth are inter-related. For example, the depth of the groove may be varied with the helix angle: the deeper the groove, the greater may the helix angle be. However, the quotient of the normal helix angle in degrees divided by the depth of the groove in inches should not exceed 40 and should be between 5 *and* [to] 40, preferably about 10 to 20. The depth of the groove may vary, for example, from ¼ to 2 inches and, in general, groove depths of from ½ to 1½ inches are preferred and employed. Roll diameter may also vary, since it is a function of the length of stroke and depth of groove. For example, if it is desired to design a roll for a 3-inch stroke, and it is decided to use a groove depth of ½ inch, one can easily calculate the diameter of the roll that should be employed. Setting the quotient of the helix angle divided by the depth equal to 20, one obtains a helix angle of 10°. The tangent of 10° being 0.176, half the circumference is equal to 3 inches/.176 or 17 inches and the diameter is therefor $(2\times17)/\pi$ or 10.9 inches. Another acceptable combination involves a normal helix angle of 20°, a stroke of 3 inches, a diameter of 5.24 inches and a groove depth of 1 inch. Thus, the worker can vary the helix angle, depth of groove and diameter of roll over a considerable range, but should hold the ratio of angle over depth to about 20. For a given roll diameter and stroke, less tension is required to hold the yarn in a deep groove than in shallow groove, and this generally results in less damage to the yarn. [However, deep grooves are more difficult to make and surface properly, so in practice grooves of from ⅛ to 1 inch deep seem desirable.]

In selecting a roll diameter, it is desirable to avoid choosing such a diameter that the final package will contain a primary ribbon wind, especially on its surface. As is well-known in the art, a primary ribbon wind occurs whenever the number of cycles of the traverse per unit of time is equal to the number of revolutions of the package. For a roll with one traverse cycle per revolution, the primary ribbon occurs when the package diameter equals the roll diameter, since at this time both package and roll are rotating at the same speed. Other less harmful ribbons occur whenever the ratio of traverse speed to package speed may be expressed as a ratio of small integers. If the roll diameter of a one stroke roll such as Figure 1 is selected to be larger than the desired package diameter, the package will not contain the primary ribbon. Large roll diameters are preferred varying from 5 to 30 inches or more with diameters of about 6 to 12 inches being preferred. There is little advantage in using rotatable members of very large diameters. However, small diameters, such as a 3 inch diameter, are not useful, because of the difficulty of obtaining a long enough stroke. This difficulty cannot be overcome by using very deep grooves, because of the diameter limitation. The use of crossed grooves, such as in U. S. 1,749,355, overcomes some of the difficulty, but, it is difficult to make such grooves of uniform depth, and, further, the strand being traversed frequently gets in the wrong groove leading to poor package formation. These and other difficulties, such as primary ribbon winds, are avoided by using the large diameter rotatable members of this invention.

Each half of the groove is shown extending over ½ the roll circumference, or 180°. This is not necessary, as more than 180° of rotation could be used for the stroke in one direction and less than 180° for the return stroke. In any case, the total path should add up to 360° of rotation and the ratio of helix angle to depth of groove should be about 20.

The yarn is traversed across the package and back to its starting point once for each revolution of the roll. This is the preferred embodiment. It is obvious that a larger roll could be designed which would give more than one traverse per revolution and still maintain the ratio of helix angle to groove depth of about 20. Also rolls are known in which more than one revolution is required for a complete traverse stroke and in these rolls the grooves cross each other. Special designs and complications are required to traverse the thread over these crossings with the result that it appears impossible to design such a roll with a groove of uniform depth and sufficient width throughout to permit proper surfacing of the groove.

In Figure 1, a roll is shown with only one continuous groove around it. It is obvious that the roll could be made longer and several individual grooves could be cut in its surface. If these grooves are cut so that the ends of their strokes are separated from each other, they will wind separate packages, one for each groove, on common or separate cores. If they are cut so that the ends of their strokes overlap, they would wind interlaced packages such as a beam. Further, it is possible to use a roll having in each groove more than two rapid reversal sections. In practice the grooves usually contain only two rapid reversal sections.

As shown in Figure 4, the edges of the package are slightly tapered, giving the effect of a shorter stroke at the outside of the package as compared with the core. This effect is produced because there is a shorter length of yarn between the roll and the package at the start than there is when the package is built up to full size.

It is also apparent that the rotatable member need not be a cylindrical drum, as shown in Figure 1, but could be shaped like a frustrum of a cone for example, to wind a cone-shaped package.

The advantages of this invention are as follows:

The thread may be traversed much more rapidly than a reciprocating guide. The rotatable members of this invention may be traversed very rapidly—1000 cycles per minute or more if necessary—thus obtaining excellent package formation and textile performance.

The rapid reversal or accelerating effect at the end of the stroke reduces the formation of dense layers as hard shoulders on the packages. Moreover, the yarn does not drag over stationary surfaces as the parts of the roll it contacts are moving in the same direction as the yarn and at almost the same speed. These features permit it to handle delicate yarns without damage.

The use of a relatively wide groove of uniform depth and without crossings permits the easy fabrication of the roll and allows the yarn contacting areas to be carefully made and surfaced so as to protect delicate yarns and this applies if the device of this invention is fabricated from a single roll or from a slotted outer cylinder cooperating with a spaced inner concentric cylinder. The over-all advantages are good cake formation with reduced sensitivity to finish, cake moisture, room humidity, swing-arm alignment, etc. Other advantages are high speed operation, little yarn damage, low maintenance, and reasonable installation cost, all resulting in improved quality, textile performance, and operating cost.

Any departure from the procedure described herein which conforms to the principles of the invention is intended to be included within the scope of the claims below.

We claim:

1. A device for traversing a continuous strand on a core comprising a rotatable member provided with means to rotate said member and with an endless groove, *comprising substantially vertical strand contacting areas,* in its surface helically cut in *cooperatively thread contacting portions comprising a* [its] major portion *cut* at an angle of from 5° to 25° [, said groove containing] *and* at least two rapid reversal sections [in said groove] cut [helically] at an angle greater than said angle in said major portion [and], said groove being cut to such a depth that the quotient of said helix angle in the said major portion in degrees divided by the groove depth in inches is between 5 *and* [to] 40.

2. A device for traversing a continuous strand on a core comprising a rotatable member provided with means to rotate said member and with an endless groove, *comprising substantially vertical strand contacting areas,* in its surface helically cut in *cooperatively thread contacting portions comprising a* [its] major portion *cut* at an angle of from 9° to 20° [, said groove containing] *and* at least two rapid reversal sections [in said groove] cut [helically] at an angle greater than said angle in said major portion [and], said groove being cut to such a depth that the quotient of said angle in said major portion in degrees divided by the groove depth in inches is between 10 *and* [to] 20.

3. A device for traversing a continuous strand on a core comprising a rotatable member provided with means to rotate said member and with an endless groove, *comprising substantially vertical strand areas,* in its surface helically cut in *cooperatively thread contacting portions comprising* [ts] *a* major portion *cut* at an angle of 10° [, said groove containing] *and* at least two rapid reversal sections [in said groove] cut [helically] at an angle greater than said angle in said major portion [and], said groove being cut to such a depth that the quotient of said angle in said major portion in degrees divided by the groove depth in inches is about 20.

4. A device for traversing a continuous strand on a core comprising a rotatable member provided with means to rotate said member and with an endless groove, *comprising substantially vertical strand contacting areas,* in its surface helically cut in *cooperatively thread contacting portions comprising a* [its] major portion *cut* at an angle of from 5° to 25° [, said groove containing] *and* at least two rapid reversal sections [in said groove] cut [helically] at an angle greater than said angle in said major portion [and], said groove being cut to such a depth that the quotient of said angle in said major portion in degrees divided by the groove depth in inches between 5 *and* [to] 40 [.] *and* said groove having a width of from ⅛ to 1 inch.

5. A device for traversing a continuous strand on a core comprising a rotatable member provided with means to rotate said member and with an endless groove, *comprising substantially vertical strand contacting areas,* in its surface helically cut in *cooperatively thread contacting portions comprising a* [its] major portion *cut* at an angle of from 5° to 25° [, said groove containing] *and* at least two rapid reversal sections [in said groove] cut [helically] at an angle greater than said angle in said major portion [and], said groove being cut to such a depth that the quotient of said angle in said major portion in degrees divided by the groove depth in inches is between 5 *and* [to] 40 [.] *and* said groove having a width of from ⅛ to 1 inch and being rounded at its upper and lower corners and having a pebbly surface.

6. A device for traversing a continuous strand on a core comprising a rotatable member provided with means to rotate said member and with an endless groove, *comprising substantially vertical strand contacting areas,* in its surface helically cut in *cooperatively thread contacting portions comprising a* [its] major portion *cut* at an angle of from 5° to 25° and at a depth of from ¼ to 2 inches and a width of from ⅛ to 1 inch [, said groove containing] *and* at least two rapid reversal sections comprising cuts [in the said groove which cuts are] made in a minor portion of the said groove at an angle greater than said angle in said major portion and having a value of from 15° to 90°, the said rotatable member having a diameter of from 5 to 30 inches.

7. A device for traversing a continuous strand on a core comprising a rotatable member provided with means to rotate said member and with an endless groove, *comprising substantially vertical strand contacting areas,* in its surface helically cut in *cooperatively thread contacting portions comprising a* [its] major portion *cut* at an angle of from 9° to 20° and at a depth of from ½ to 1½ inches and a width of from ⅛ to 1 inch [, said groove containing] *and* at least two rapid reversal sections comprising cuts [in the said groove which cuts are] made in a minor portion of the said groove at an angle greater than said angle in said major portion and having a value of from 15° to 90°, the said rotatable member having a diameter of from 6 to 12 inches.

8. A device for traversing a continuous strand on a core comprising a rotatable member provided with means to rotate said member and with an endless groove, *comprising substantially vertical strand contacting areas,* in its surface helically cut in *cooperatively thread contacting portions comprising a* [its] major portion *cut* at an angle of 10° and at a depth of 21/32 inch and a width of ½ inch [said groove containing] *and* two rapid, rounded reversal sections comprising cuts [in the said groove which cuts are] made in a minor portion of the said groove at an angle of about 90°, said rotatable member having a diameter of 7⅞ inches.

*9. A device for traversing a continuous strand on a core comprising a rotatable member provided with means to rotate said member and with an endless groove, comprising substantially vertical strand contacting areas, helically cut in its surface, said groove comprising at least two main lead portions merged with at least two reversal lead portions, the said main lead portions constituting a major portion of the groove, angle measurements in said main lead portions being substantially the same and being between 5° and 25° and the reversal lead portions being cut at an angle greater than the angles of the said main lead portions, the said groove being cut to such a depth that the quotients of the said angles of said main portions in degrees divided by the groove depth in inches is between 5 and 40.*

*10. A device in accordance with claim 9 in which the angle measurements of said main lead portions ar 9° to 20°.*

*11. A device in accordance with claim 9 in which the said groove has a substantially flat bottom.*

*12. A device in accordance with claim 1 in which the said groove has a substantially flat bottom.*

References Cited in the file of this patent or the original patent

UNITED STATES PATENTS

| | | |
|---|---|---|
| 868,013 | Rivett | Oct. 15, 1907 |
| 880,552 | Lundin | Mar. 3, 1908 |
| 1,161,284 | Beltz | Nov. 23, 1915 |
| 1,175,710 | Colman | Mar. 14, 1916 |
| 1,268,684 | Colman | June 4, 1918 |
| 1,727,884 | Jessen | Sept. 10, 1929 |
| 1,918,210 | McKean | July 11, 1933 |
| 1,928,365 | Anderson | Sept. 26, 1933 |
| 1,975,037 | Durand | Sept. 25, 1934 |
| 1,980,113 | Taylor | Nov. 6, 1934 |
| 2,151,327 | Moncreif | Mar. 21, 1939 |
| 2,249,147 | Kuppers | July 15, 1941 |
| 2,320,891 | Ryder | June 1, 1943 |

FOREIGN PATENTS

| | | |
|---|---|---|
| 1,051 | Great Britain | Jan. 9, 1884 |